United States Patent
Mills et al.

(10) Patent No.: US 10,938,672 B2
(45) Date of Patent: Mar. 2, 2021

(54) CONTROL NETWORK, SYSTEM AND METHOD

(71) Applicant: Quorso UK Limited, London (GB)

(72) Inventors: Julian Mills, London (GB); Daniel Slowe, London (GB)

(73) Assignee: Quorso UK Limited, London (GB)

( * ) Notice: Subject to any disclaimer, the term of this patent is extended or adjusted under 35 U.S.C. 154(b) by 0 days.

(21) Appl. No.: 16/413,969

(22) Filed: May 16, 2019

(65) Prior Publication Data

US 2019/0363949 A1 Nov. 28, 2019

(51) Int. Cl.
*H04L 12/24* (2006.01)

(52) U.S. Cl.
CPC ........ *H04L 41/5009* (2013.01); *H04L 41/046* (2013.01); *H04L 41/16* (2013.01)

(58) Field of Classification Search
CPC ... H04L 41/5009; H04L 41/046; H04L 41/16; G06Q 10/067
See application file for complete search history.

(56) References Cited

U.S. PATENT DOCUMENTS

| | | | | |
|---|---|---|---|---|
| 7,249,117 B2 * | 7/2007 | Estes | ...................... | G06Q 50/22 706/52 |
| 7,457,864 B2 * | 11/2008 | Chambliss | ............ | H04L 41/024 702/182 |

(Continued)

FOREIGN PATENT DOCUMENTS

| | | |
|---|---|---|
| EP | 2728426 | 5/2014 |
| EP | 2924572 | 9/2015 |

OTHER PUBLICATIONS

Search Report dated Sep. 2, 2019 for European Patent Application No. 19175078.

(Continued)

*Primary Examiner* — Todd L Barker
(74) *Attorney, Agent, or Firm* — Thomas | Horstemeyer, LLP

(57) ABSTRACT

A control network, system and method is disclosed for control of a plurality of entities. The control network comprises a control hub, a data repository and a plurality of control agents. The data repository models each entity as a plurality of granular components, each granular component having a type selected from a set of granular component types. The control hub is configured to receive performance data on each entity, translate the performance data into data on the granular components and store the transformed data in the data repository in association with its respective granular component. The control hub is further configured to determine an optimal control action in respect of a granular component of one of the entities in dependence on the granular component's transformed data and on transformed data in the data repository for other granular components having the same type. Each of the plurality of control agents being linked to one of the entities and associated with one or more of the respective entity's granular components, the control hub being arranged to communicate the control action to the control agent associated with the granular component to trigger the control agent to effect the control action via the link.

15 Claims, 7 Drawing Sheets

(56) References Cited

U.S. PATENT DOCUMENTS

| | | | |
|---|---|---|---|
| 8,307,109 B2 * | 11/2012 | Mamou | G06F 16/254 |
| | | | 709/232 |
| 8,452,786 B2 * | 5/2013 | Klinker | G06Q 10/067 |
| | | | 707/754 |
| 10,620,923 B2 * | 4/2020 | Allan | G06F 3/0428 |
| 10,776,086 B2 * | 9/2020 | Seetharaman | G06F 8/433 |
| 2009/0013025 A1 | 1/2009 | Soejima | |
| 2011/0213542 A1 | 9/2011 | Chazal | |
| 2015/0162180 A1 | 6/2015 | Grau et al. | |

OTHER PUBLICATIONS

Search Report dated Nov. 19, 2019 for United Kingdom Patent Application No. 19069577.4.

\* cited by examiner

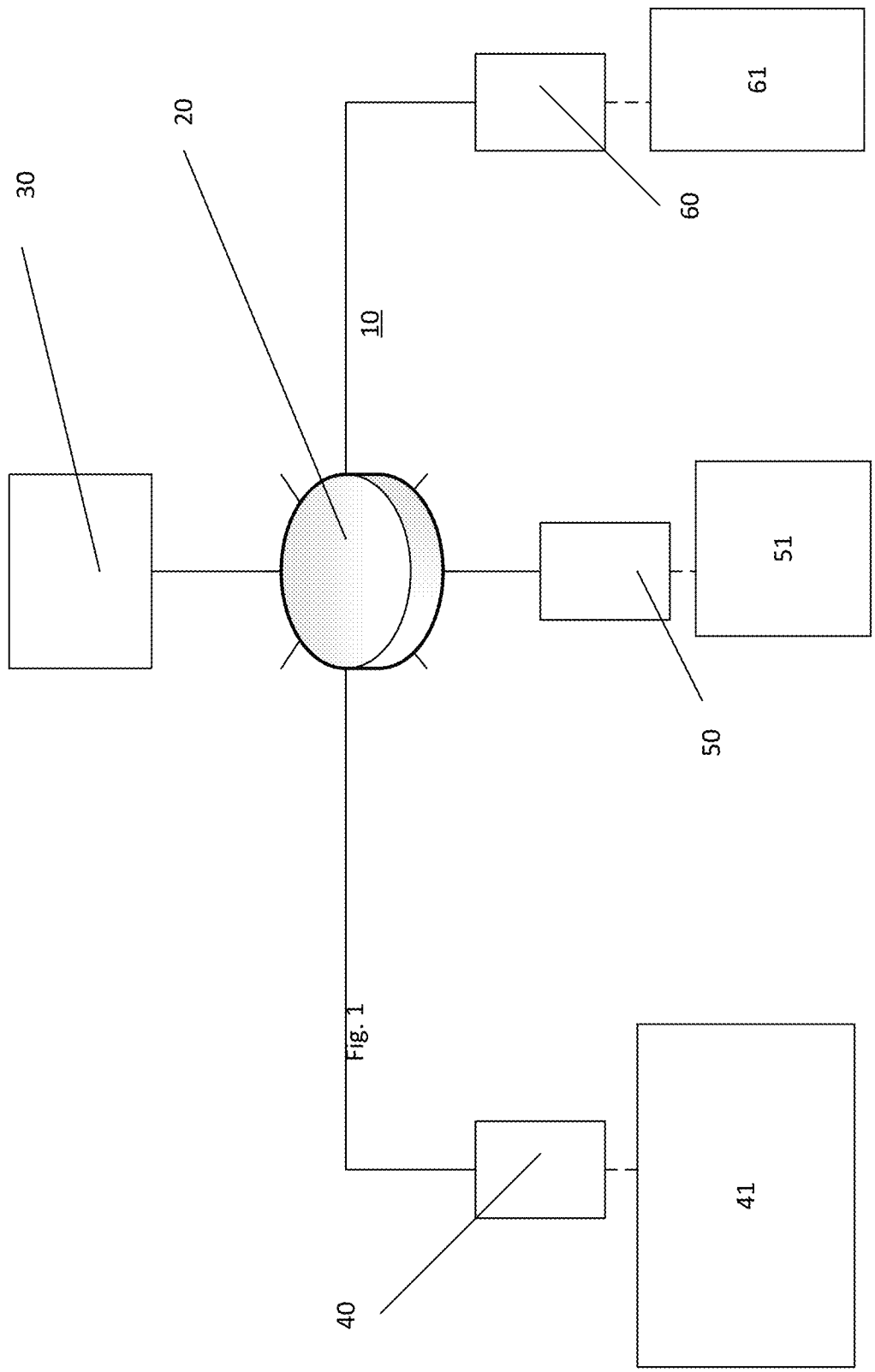

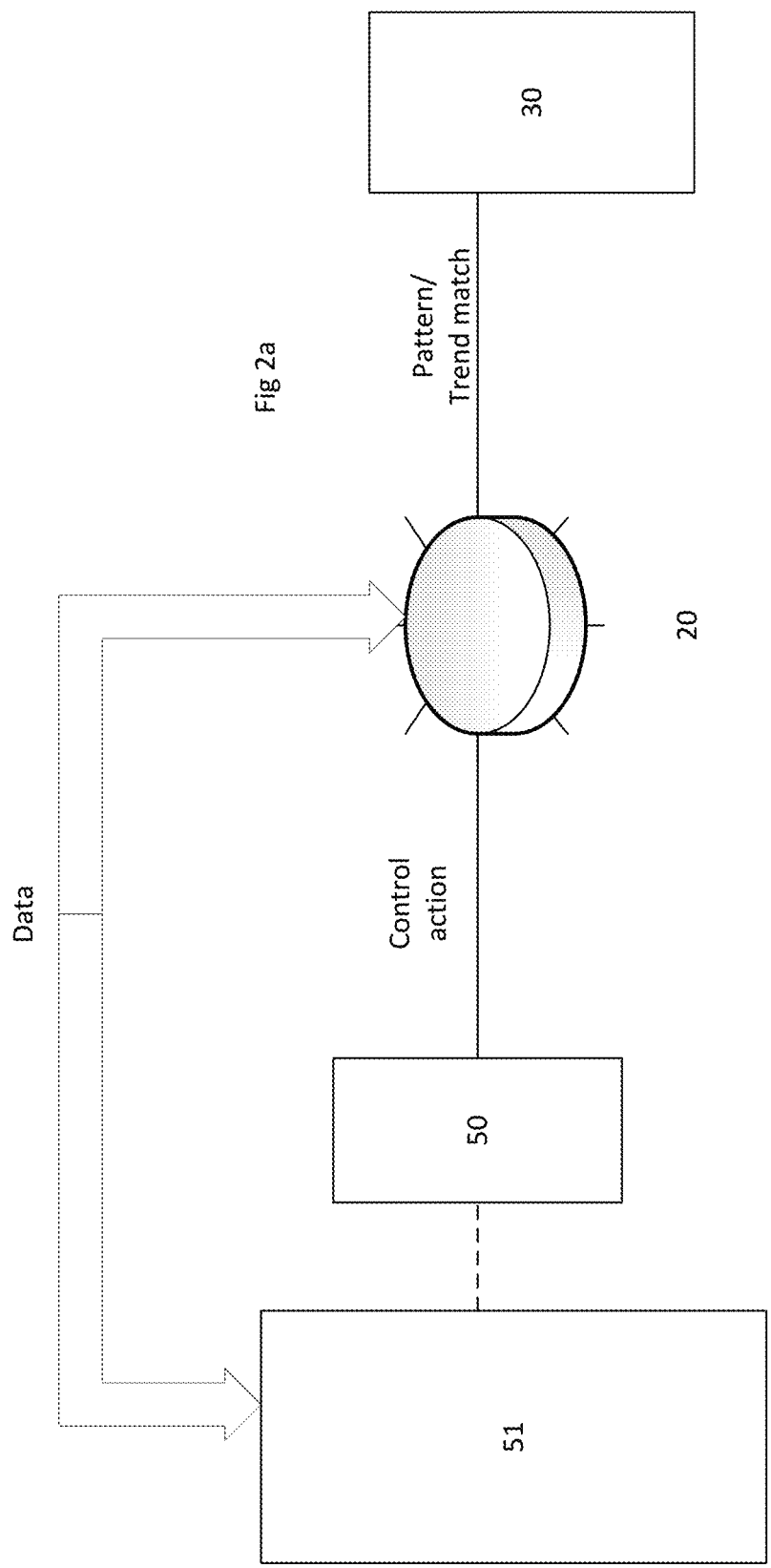

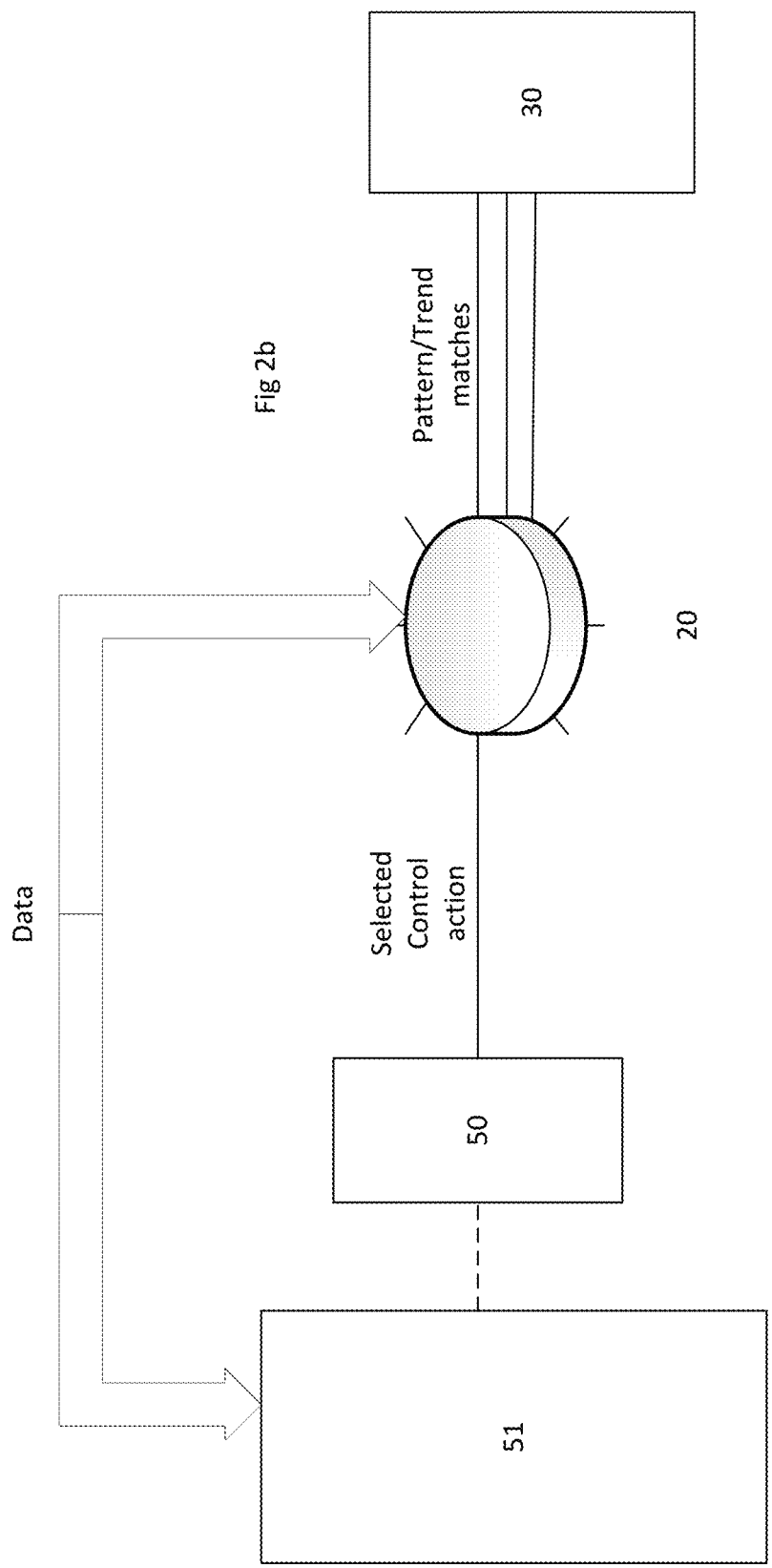

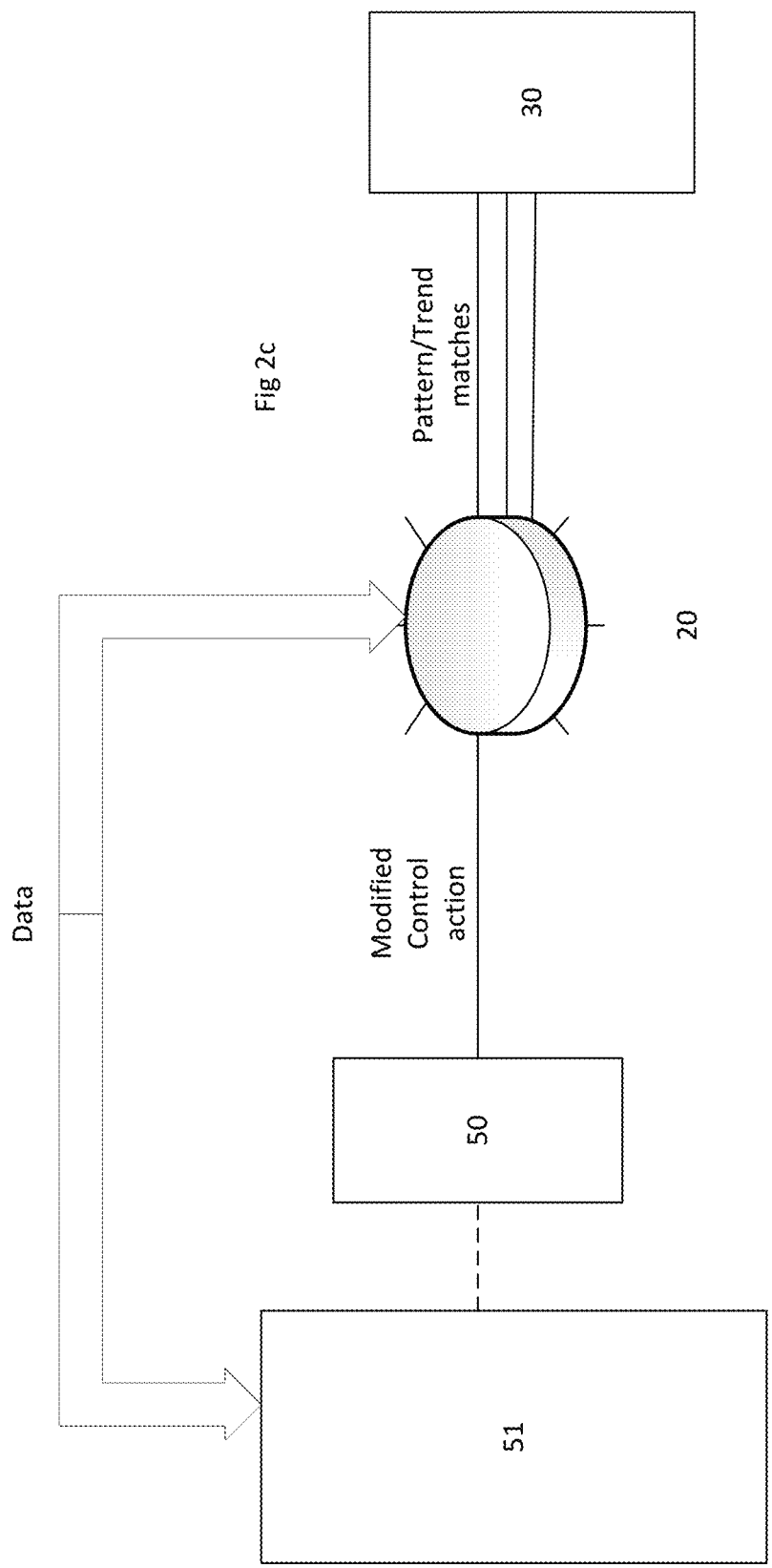

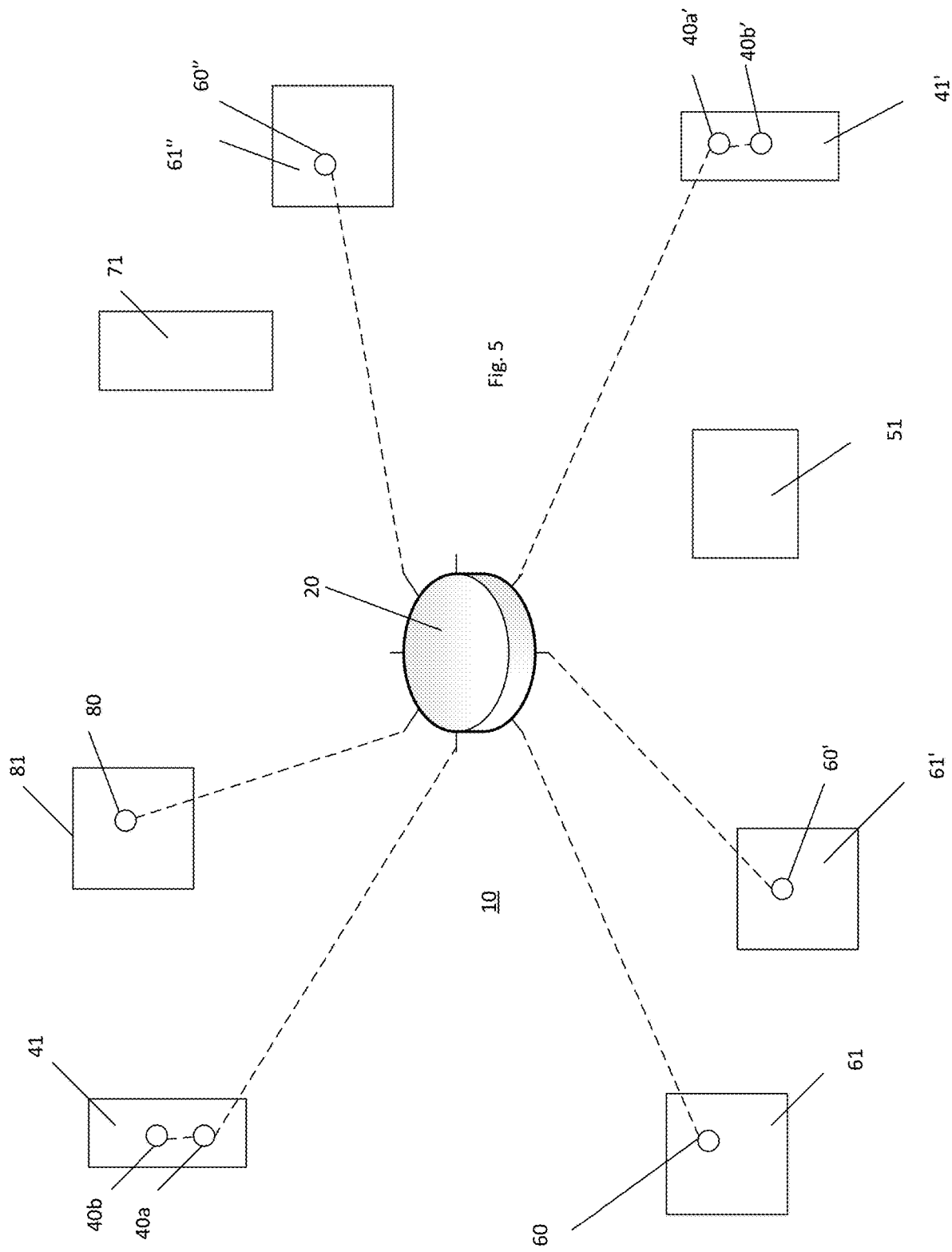

CONTROL NETWORK, SYSTEM AND METHOD

CROSS-REFERENCE TO RELATED APPLICATION

This application claims priority to GB Patent Application No. 1808065.5 filed May 17, 2018, the contents of which are incorporated by reference in its entirety as if set forth herein.

FIELD OF THE INVENTION

The present invention relates to a control network, system and method that is particularly applicable to optimal control of disparate entities.

BACKGROUND TO THE INVENTION

A control system typically manages, commands, directs, or regulates the behaviour of other entities such as devices, networks or systems. There are numerous ways this can be done including using feedback or feedforward control loops.

The entities controlled can range from single home heating controllers using a thermostat controlling a domestic boiler to large industrial control systems which are used for controlling processes, operations or machines.

One challenge in control system engineering is the definition and management of the control model. If the entity to be controlled is not modelled appropriately or accurately, the control loop is unlikely to be able to provide optimal or timely control.

Modelling can be done manually or automatically. It may also use heuristic logic approaches to tune the model incrementally over time.

STATEMENT OF INVENTION

According to an aspect of the present invention, there is provided a control network for control of a plurality of entities. The control network comprising:

a control hub, a data repository and a plurality of control agents. The data repository modelling each entity as a plurality of granular components, each granular component having a type selected from a set of granular component types, wherein the control hub is configured to receive performance data on each entity, translate the performance data into data on the granular components and store the transformed data in the data repository in association with its respective granular component. The control hub being further configured to determine an optimal control action in respect of a granular component of one of the entities in dependence on the granular component's transformed data and on transformed data in the data repository for other granular components having the same type, each of the plurality of control agents being linked to one of the entities and associated with one or more of the respective entity's granular components, the control hub being arranged to communicate the control action to the control agent associated with the granular component to trigger the control agent to effect the control action via the link.

Preferably, the set of granular component types is predetermined. It may be that a granular component has a single type or it may have multiple types. The system is preferably arranged to ensure consistent modelling so that a later encountered entity is modelled as the same type(s) as an earlier entity. The set may grow over time, in which case there may be housekeeping to ensure that existing granular components remain in the appropriate classification(s).

In embodiments of the present invention it is recognised that controlled entities are not generally monolithic. Embodiments of the present invention enable entities to be modelled and controlled on a granular level. In this manner, control actions can also be implemented at different levels of granularity. Preferably, the granularity is a hierarchy with entities being modelled as a plurality of components linked by the hierarchy, the granularity increasing down the hierarchy. Optionally, different agents may be responsible for different levels of granularity within the control network with lower level agents being delegated control actions for their level of the hierarchy or deeper by agents further up the hierarchy. Selection of control actions may be based on various factors. For example, an action may be selected based on impact to the respective component or an aspect of the entity known to be closely associated to the respective component, it may be selected based on expected impact on parent/child components in the hierarchy and/or it may be selected due to some more global optimisation being undertaken.

In preferred embodiments, the model includes relationships between components such that the impact of a control action on required inputs consumed and outputs produced by a component can be evaluated up and down the hierarchy so as to assess the overall impact of the control action.

Preferably an agent is closely coupled to those above or below it in the hierarchy (those above being reported to by the agent and being able to exert control over the agent and those below reporting to and configured with rights to direct agents lower in the hierarchy and receive reports from those agents). Preferably, the agent is loosely coupled to agents in other entities by links to common component type(s). The control hub acts as an intermediate, providing communication between loosely coupled agents.

Agents may differ in type, and communications channel supported, capabilities or other attributes. For example, one agent may be a PID controller (a proportional-integral-derivative controller that typically has tunable parameters to optimise feedback control) while another may be an interface for adjusting proportions of a reagent mix or other operational parameters in an entity such as a system to be controlled. The agent need not be directly coupled to the entity. For example, the agent may be a human machine interface in which a human operator is instructed to apply certain actions to the controlled entity and optionally provide feedback via the interface once the action(s) are performed.

In entities where agent types vary, preferably the agent type assigned to a component is recorded in the model to ensure that only possible control actions are selected for that agent/component.

Due to the control network architecture, entities are modelled from common types to identify common component types within the entities. In this way relevant optimal control actions can be shared between entities and an outcome of a control action for one component of a type can be used to guide the selection of control actions of other components of a same or related type. As a result, modelling and control actions can be shared and exchanged. Due to modelling at a granular level, aspects of a model or control action can be shared and exchanged so that an entity with comparable features can benefit, even where the entity is in another organisation that may be a competitor or potentially in a completely unrelated market and the data from which the control action was originally determined is proprietary or confidential.

Embodiments of the present invention seek to provide a control network, system and method of operation that allow users to couple and decouple disparate entities for optimal control and optimization. The control network is preferably composed of disparate entities. The system preferably includes: determining and defining disparate entities in the control network and determining the optimal method of operation for disparate entities in the control network. The method preferably includes: determining whether one or more disparate entities are entities which can operate in a control network, and controlling the entities of said control network based on the determination of results from the analysis of the entities which reduces the volatility between and within these entities.

BRIEF DESCRIPTION OF THE DRAWINGS

Embodiments of the present invention will now be described by way of example only with reference to the accompanying drawings, in which:

FIG. 1 is a schematic diagram of a control network according to an embodiment of the present invention FIGS. 2a-c are diagrams illustrating control action selection;

FIG. 5 is a schematic diagram illustrating selected aspects of an embodiment of the present invention.

DETAILED DESCRIPTION

Figure 3:
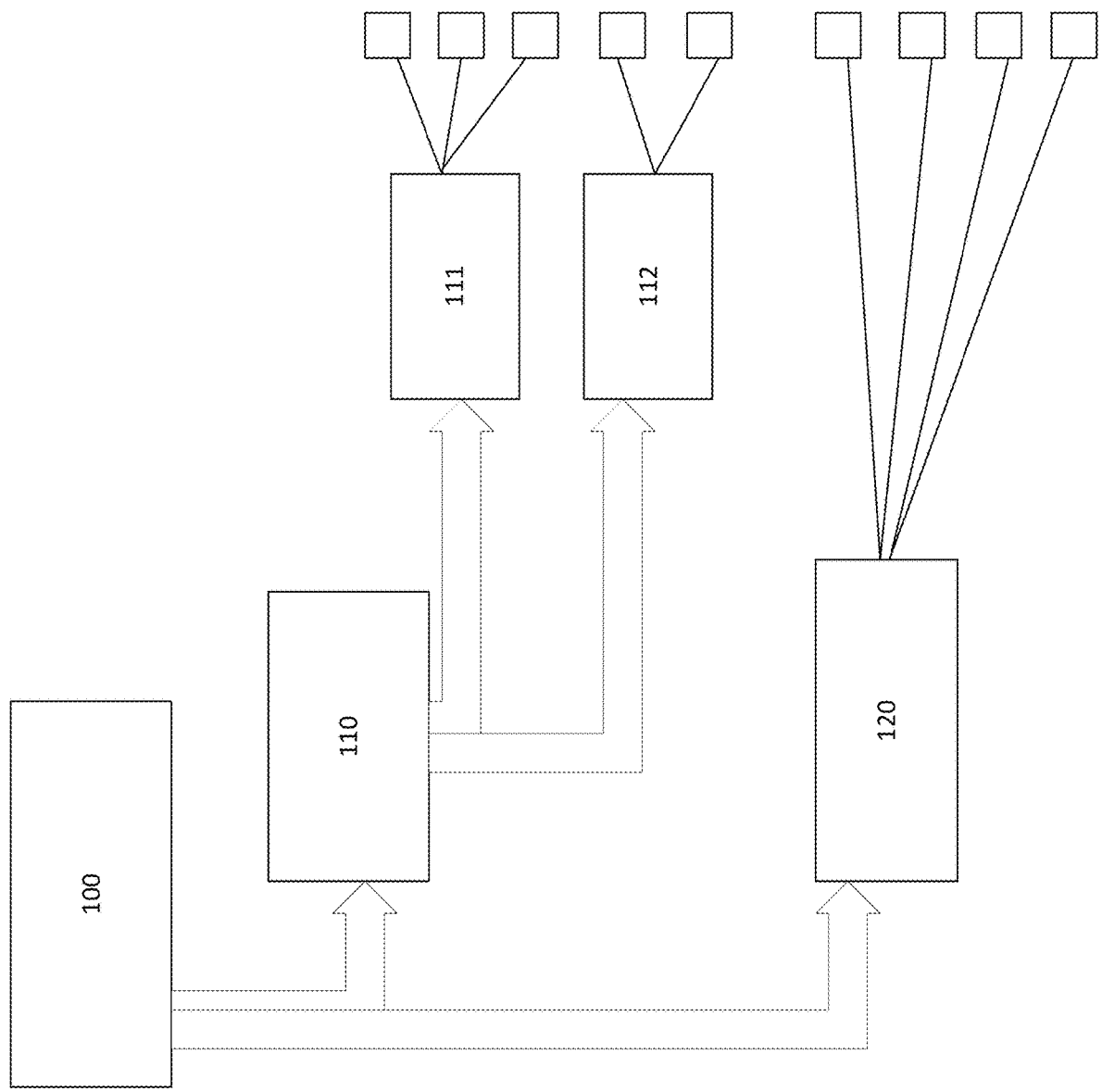
FIG. 3 is a schematic diagram of a simplified component model hierarchy.

FIG. 1 is a schematic diagram of a control network according to an embodiment of the present invention.

The control network 10 includes a control hub 20, a data repository 30, and a plurality of control agents 40, 50, 60.

Each entity 41, 51, 61 is modelled in the data repository 30 as a plurality of granular components, each granular component having a type selected from a set of granular component types.

The modelling approach enables entities to be constructed from granular constituents (and those granular constituents to be sub-divided into increasingly granular components). Use of common component types enables comparison between entities at a constituent level.

The control hub 20 is configured to receive data including performance data on each entity 41, 51, 61, translate the data into data on the granular components and store the transformed data in the data repository 30 in association with its respective granular component. The data may be retrieved or received by the control hub 20. It might come from sensors, the control agents themselves and/or databases such as accounts systems, enterprise resource planning systems etc. In one embodiment, ETL software is used to obtain data from other data sources. It may also be imported as csv, input manually etc. The model, components and data on the entity in the repository enables the control hub to divide, convert and assign, as necessary, the data to the various components.

The control hub 20 is further configured to determine an optimal control action in respect of a granular component of one of the entities 41, 51, 61 in dependence on the granular component's transformed data and on transformed data in the data repository for other granular components having the same type.

As discussed below, the data is monitored for trends, patterns etc and these are matched or predicted against those seen previously from the same and other components for the control hub to identify optimisation opportunities which are translated into optimal control actions that are determined to likely have the most optimal effect.

Each of the plurality of control agents 40, 50, 60 is linked to one of the entities 41, 51, 61 respectively, and is associated with one or more of the respective entity's granular components, the control hub 20 being arranged to communicate the control action to the control agent 40, 50, 60 associated with the granular component to trigger the control agent 40, 50, 60 to effect the control action via the link.

The control hub 20 preferably continuously monitors the received data. It will be appreciated that many different approaches for monitoring can be applied from pattern matching, to statistical analysis, to heuristic/artificial intelligence approaches. The control hub attempts to classify data on components against previously seen data trends or patterns. Previously seen data trends or pattern are classified in the data repository against control actions taken and outcome achieved. If a data trend or pattern is identified for a component, it is matched against previously seen trends or patterns for corresponding components and upon finding a match, the control hub 20 determines if a control action may be appropriate. There may be other factors associated with the entity that makes the control action inappropriate and/or a competing trend or pattern may result in a selection being needed from multiple control actions to determine that which is most optimal/fitting for current and long term control of the entity.

In one embodiment, an opportunity is identified by:
Normalising input cost and output by a normalisation factor to produce unit cost/output
Benchmarking against other (preferably 3+) comparable components in other organisations/locations etc
Calculating gap between unit cost/input and median performance
Multiplying gap by normalisation factor to identify potential optimisation.

For example, performance data on the second entity 51 may exhibit a trend or show an opportunity in respect of one of its components that the control hub has previously seen in a component of the first entity 41. Taking into account the control action that was taken by the relevant agent from the second entity and the outcome that arose, the control hub may communicate the same control action to the control agent of the second entity as illustrated in FIG. 2a, it may pick from a number of control actions previously used as illustrated in FIG. 2b or it may communicate an optimised control action as illustrated in FIG. 2c.

Preferably, data in the repository is anonymised and distributions of guessable metrics such as location are used to preserve confidentiality and minimise the risk of leaking the identity of the entity that originated the benchmark data or control action.

Preferably, performance data is the performance data obtained or measured during normal operation of the entity. While agents or other monitors may be tasked with providing performance data, embodiments of the present invention can operate with existing performance data that a system will produce and have monitored, either directly by sensors and the like or indirectly via data from monitoring systems, operational systems and other back-end systems such as accounting systems from which performance data can be obtained (either directly extracted or determined or estimated from data from one or more of the sources).

It will be appreciated that the granular approach and the actual components used will depend on the modelled entity. Devices can be modelled as components and sub-components or, in some instances, functionally. Likewise, systems can be modelled as inter-related components and/or functional units. The model components will typically define inputs and outputs, an input being consumed and an output being produced.

An example, simplified, hierarchy is illustrated in FIG. 3. In this illustration, a model of a heating system is shown with the top level 100 reflecting the overall system (input=fuel cost, output=temperature of heated room), a first level splits the system into a gas boiler system 110 with the boiler 111 heating a water filled radiator 112, and an electric radiator 120; subsequent levels (a first of which is shown) split the boiler and electric radiator into granular components.

The purpose of the control network is to enable learning and benchmarking across entities that may be subject to different and variable control. The control agents linked to the components may themselves be able to apply control mechanisms such as feedback, feedforward etc and it may also be a learning controller that is capable of operation independently of the control hub 20. However, particular advantages of embodiments of the present invention arise from the loose intra-entity coupling that the control hub 20 facilitates, particularly where there is a population of entities (preferably a large population) where data patterns, control actions and outcomes can be collected, learned from and offered to other components in different entities as the optimisation opportunity arises.

In the embodiment of FIG. 3, control agents may be deployed to heating systems in different buildings, cities etc. While individual control agents may be sufficient for day-to-day operation, relaying of operational data, weather patterns, the frequency of servicing etc enables the control hub to look at the heating systems from different levels of granularity, potentially identifying operational changes that impact efficiency, longevity etc.

Typically the model and control network is used for optimising control during operation so factors that are difficult to change (such as radiator size) would not be modelled as a variable input. However, it will be appreciated that such an approach could be taken and used for specifying system components (replace component X, upgrade capacity of component Y, etc.).

Scaling of model components is preferably dealt with separately to the model itself. For example, a normalisation factor may be stored by the data repository such that the cost and output per unit can be determined from the performance data and like components and their cost and output can be compared irrespective of scale or deployment.

Figure 4:
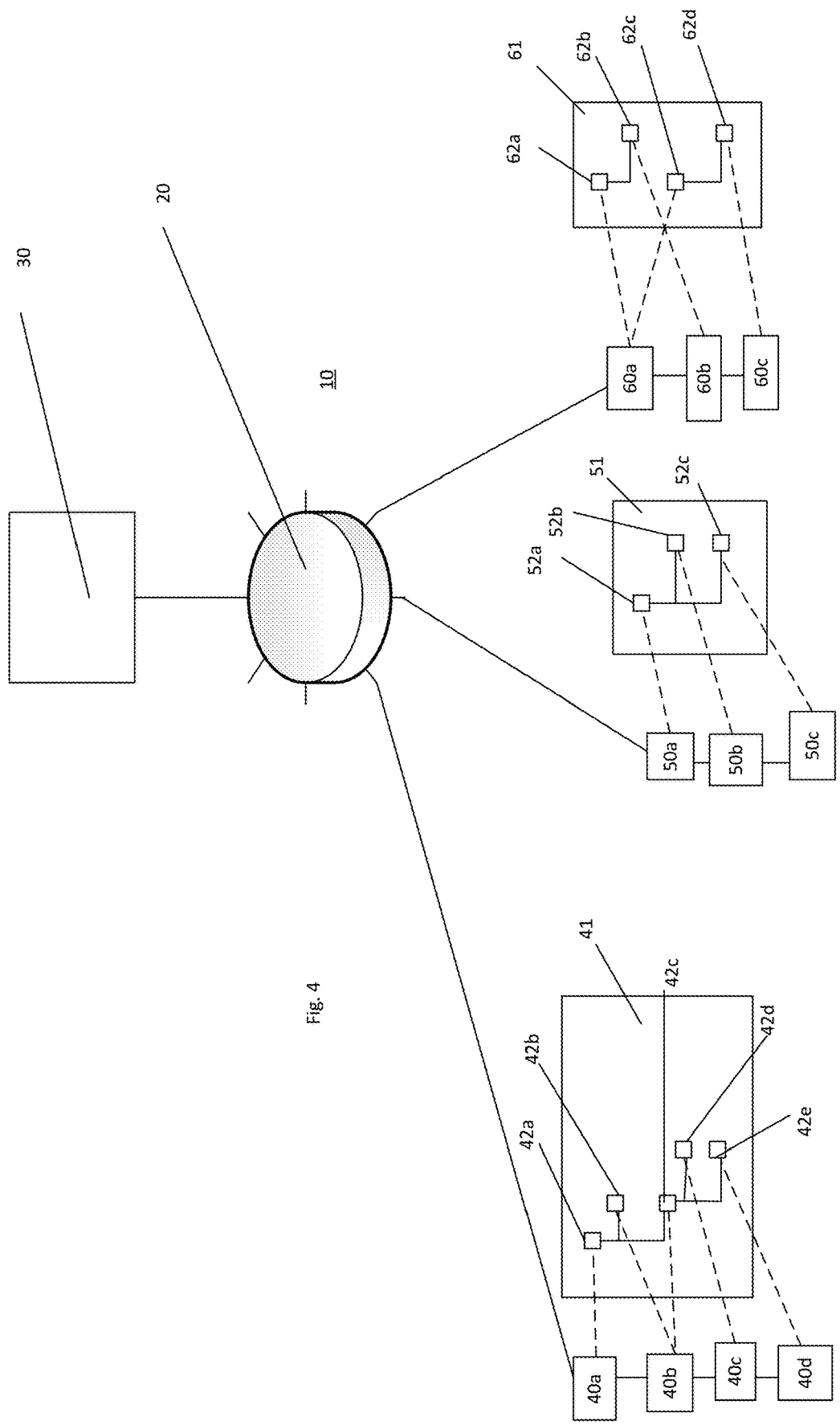
FIG. 4 is a schematic diagram illustrating selected aspects of the embodiment of FIG. 1 in further detail.

FIG. 4 is a schematic diagram illustrating preferred aspects of the embodiment of FIG. 1 in more detail.

In this embodiment, a plurality of control agents for each entity are shown (40a-40d; 50a-50c; 60a-60c). The respective entities are modelled as components 42a-42e; 52a-52c; 62a-62d in respective hierarchies. In this embodiment, agents are linked to components in different levels of the hierarchy, effectively forming a hierarchy of agents. As can be seen, there need not be a 1:1 correspondence between control agents and granular components. However, it is preferable that sufficient control agents are deployed to an entity so as to have bandwidth to focus on its assigned granular components—you may not deploy a control agent to watch over every tuneable element of a production line but likewise a single control agent would likely be unable to effectively apply control actions spanning hundreds of components in a timely manner.

Each control agent may communicate directly with the control hub 20 and/or communicate via the control agent hierarchy. For example, a control action for agent 40c to act on component 42d may be communicated directly to the agent or it may be communicated to its superior agent 40a which in turn can approve and pass down the control action (or not).

In the illustrated, preferred, embodiment an agent is closely coupled to those above or below it in the hierarchy of the same entity. Those agents above are reported-to by the agent and being able to exert control over the agent. Those below report to the agent and are configured with rights to direct agents lower in the hierarchy and receive reports from those agents. Agents lower in the hierarchy report-to and seek approval from agents higher in the hierarchy. Conversely, agents higher in the hierarchy receive reports from and provide approval to agents lower in the hierarchy.

The reporting mechanism allows control agents operating at a higher more abstract level to take into account activity taking place at a more detailed granular level. Deployment of agents at various levels means that agents can have different focus—some being responsible for the details and other being responsible for the bigger picture operations. The approval mechanism, while preferred is optional. Control agents may be autonomous, in which case approval is not needed. However, in at least selected circumstances, approval for control actions may be required. The need for inter-hierarchy approval may be dependent on the level of control agent (those at lower levels needing more frequent approval than those higher up) or the type, risk or disruptiveness of the control action to be triggered.

Control agents may be software or hardware components or some combination thereof. They may be autonomous, semi-autonomous (requiring approval from the hierarchy and/or from an operator for certain control actions) or a human interface to receive or cause manual action. A mixture of different control agent types may be deployed across an entity or control network.

In one embodiment, a control agent may be or include a smart phone application that presents control actions to a user via a user interface to approve and in certain cases action. The application may present multiple identified opportunities to a user and direct him or her on how to apply these to the component to achieve the optimisation and/or seek user approval for the application to trigger the control action on the component. In the case of multiple opportunities, those of highest potential impact may be highlighted in the user interface. Optionally the control hub 20 and/or the control agent may include a bot or other machine intelligence to coach and/or guide the user in implementing the control action.

The control agent may include or link to a user interface that provides a recommendations. All the opportunities/potential control actions are sifted and typically 5-10 are identified that have a very high probability of being successful. Preferably, this is a hybrid recommender system which uses a mixture of content scoring and collaborative filtering to identify items that it is expected would have a probability of successful implementation >90%.

After the control action has been triggered, the application may seek feedback from the user, seeking input on the outcome of the control action, what the user may have done in addition to the control action. This information is communicated back to the control hub 20 to be added to the data repository 30 linked to both the model of the component and also the opportunity pattern and control action.

When a control action is applied to a component, it is preferred that the control agent communicates the application and outcome back to the control hub 20. While this may in some instances be detected from the performance and other data on the entity being fed back to the control hub 20, it is preferred that direct communication from the control agent is provided. This not only removes any ambiguity, but it also means that the control hub 20 knows when the control action is applied and it can monitor the effect over time.

Preferably, the agent is loosely coupled to agents in other entities by links to common component type(s). The control hub acts as an intermediate, providing communication between loosely coupled agents.

Typically the links will arise from the use of the common component types. However, certain links may also be defined by labels during modelling that might describe features such as location, climate or other attributes that may not be efficiently or easily defined via component type but still may have an impact on the component model and other component models it could be compared to or benchmarked against.

It will be noted that embodiments of the presently claimed invention are highly scalable and that the hierarchy of control agents illustrated in FIG. 4 is simplified for explanation purposes. It will be appreciated that large numbers of agents can be arranged in hierarchies to control complex systems at high levels of granularity simply by extending the hierarchies to match the components of the modelled system and assigning corresponding agents.

The control agent hierarchy may also be used for control plans/actions originating from control agents. Agents can seek approval for control plans/actions from agents further up the hierarchy and also take into account control actions/results reported from subsidiary control agents when planning their own respective control strategies.

FIG. 5 is a schematic diagram illustrating selected aspects of an embodiment of the present invention. Certain aspects of the system have been simplified for the purposes of illustration. For example, only selected entities and agents are illustrated whereas in general embodiments would include large numbers of entities (so as to capture comparison data) and multiple agents per entity (the number depending on how entities can be decomposed into granular components, what is controlling these etc).

In the illustrated embodiment, similarities between entities are identified by the use of common reference numerals. This does not necessarily mean the entities themselves are the same, simply that at the level of granularity/agent illustrated they are comparable.

For example, entity 61 may have a granular component that is the same as that of a component of entity 61' but with a difference in scale by a factor of 3. Entity 61" may be in a completely different industry/technology area but its component may have been classified during modelling as substantially the same as that of the components of entities 61 and 61'.

FIG. 5 illustrates one such example. Those entities linked to the control hub 20 by dotted lines in this example have components of the same or substantially comparable types. They of course may also have components that are not comparable to those shown as likewise will other entities such as 51 and 71.

The ability for this comparison arises from the modelling by granular components as components of same/comparable type will be identified during modelling and labelled as such in the data repository. The components/entities may operate at differing degrees of scale but once normalised, the components can be compared like for like. Over time, performance and control action history for the granular components are built up by the control hub 20 and data repository. It may be that based on data received on current performance of entity 81 that the control hub 20 extracts performance data for each of entity 81's granular components and identifies a particular granular component that is operating 20% less efficiently than another component of the same type in entity 61'. Other components will also have contributed to the history of performance data in the data repository but may not be performing as optimally as that of entity 61', for example.

Based on this identification, the control hub 20 identifies the control action or actions to provide to the entity 81 the agent 80 responsible for the component.

This may be a single action, a series of actions, a selection of different actions to be selected from by the agent or some other combination. The action preferably is scaled to de-normalise it and customise it to suit the scale of the relevant component before being sent to the agent. In some circumstances, the agent may have different capabilities (type of control it may apply, authority, etc) and the control action may be modified before being sent to as to achieve the same effect but based on the agent's abilities.

As will be seen from above, in embodiments of the present invention the control hub 20 and data repository 30 are building a historic database of performance against granular components that are modelled from a common set of component types. Optimisation opportunities are identified from current (and potentially historic) performance data for a particular entity/component with reference to the database and a corresponding control action (or actions) is/are determined from the database and provided to an associated agent to implement.

Advantageously, in embodiments of the present invention none of the entities know or find out anything about other entities. The control hub 20 acts as intermediary and anonymises data and control actions so that they may be shared for the benefit of all. Competitors may anonymously share data so that optimal control actions can be formulated and shared for the benefit of all.

It will be appreciated that how control actions are selected may vary from one embodiment or another and/or from one entity to another. As the history of performance and actions builds with number of entities, components and over time, it will also be necessary to intelligently select/filter actions to make this step manageable and useful in identifying the best optimisation actions.

In one embodiment, control actions are selected as follows:

Step 1: Preparing the recommendation pool
1. Identify control actions for below-average entities/components
2. Enable flagging of datapoints (either those deemed sub-optimal or those seeing particular performance). This may be done automatically or manually (such as from feedback from control agents)
3. Determine the actions to go into a 'recommendation pool' by:
   a. excluding 'No opportunity' items
   b. excluding minimal opportunities and those that conflict or overlap within the hierarchy for an item Step 2: Select best control actions from recommendation pool An algorithm then selects actions which best meet optimisation criteria from that pool. The criteria may be general (best performance improvement based on input change) or specific to the component and defined in the model as optimisation criteria for the component. Preferably, the algorithm is a 'hybrid' system which combines content filtering and also collaborative filtering.

In content filtering, the system considers the intrinsic characteristics of the components themselves. There are 3 dimensions to consider:

What the system counts as an opportunity: there are many ways in which to identify opportunities (i.e., variance vs. peer median, variance vs. last year, and variance vs. budget/forecast)

What time periods it considers: the system should identify opportunities in areas that are low performance now and still will be a couple of months hence. It may also identify components that have been bad for a couple of periods (and hence are structurally poor), or have suddenly gotten worse How it ranks those opportunities: For each of these (or any combination) one can rank based on the absolute variance (e.g., $100 over) or a statistical measure of variance (e.g., 99th percentile or 1.8× the budget or other target).

In collaborative filtering, the system also takes into account what other agents have reported works over time.

Preferably, a mix of control actions are provided as follows:

A—Known pain points: these are likely to be on the entity's radar, if they are material, and hence implementable but relatively unserendipitous.

B—Stretch improvements: these are areas where the entity could improve performance but requires a more fundamental change or more resources to do so or perhaps has been rejected previously.

C—Possible diamonds in the rough: these are a high risk/high reward recommendation.

Timing/maturity of the entity may also be taken into account. For example, one doesn't want to set a plan if historic data from others shows it will improve anyway. On maturity, 'structural' opportunities should preferably addressed prior to minor optimisations.

Step 4: How to rank opportunities

Where multiple opportunities are provided to an agent, they may be ranked. Preferably, these are ranked according to materiality. There are 3 issues to consider.

First, how to combine the multiple 'variance' results into a single number. E.g., if a component has a Peer Median variance of $1000 compared to comparable components and a Last Year variance of $500, one approach may be to take an unweighted average of any variances available. Hence in the case above, the average variance would be $750 (i.e., [$1000+$500]/2). This may be ranked higher than an action for the component that has a variance of $200 as it would have a bigger impact.

Preferably, the system learns over time based on the actions that individual agents took.

One way to do this would be to assign a % denoting the probability of improvement based on what the agent did. For example, one might assume that each recommendation starts off with a 50% chance of leading to improvement. Based on what happens each time that action for the component is provided to an agent, one updates the ranking.

Optionally, the control hub 20 and/or control agents may provide or utilise machine intelligence such as chatbot-type technologies to guide operators in implementing the actions and explaining the expected outcomes via a user interface at the agent.

It is to be appreciated that certain embodiments of the invention as discussed above may be incorporated as code (e.g., a software algorithm or program) residing in firmware and/or on computer useable medium having control logic for enabling execution on a computer system having a computer processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art without departing from the present invention which is defined by the recitations in the claims below and equivalents thereof.

The invention claimed is:

1. A control network for control of a plurality of entities, the control network comprising:
   a control hub, a data repository and a plurality of control agents,
   the data repository modelling each entity as a plurality of granular components, each granular component having a type selected from a set of granular component types,
   wherein the control hub is configured to receive performance data on each entity, translate the performance data into data on the granular components and store the transformed data in the data repository in association with its respective granular component, the control hub being further configured to determine an optimal control action in respect of a particular granular component of one of the entities in dependence on the particular granular component's transformed data and on transformed data in the data repository for other granular components having the same type,
   each of the plurality of control agents being linked to one of the entities and associated with one or more of the respective entity's granular components, the control hub being arranged to communicate the control action to the control agent associated with the particular granular component to trigger the control agent to effect the control action via the link.

2. The control network of claim 1, wherein the entity is modelled as a hierarchy of the plurality of the granular components, each respective granular component corresponding to an element of the entity, the element comprising a component, attribute or function, each respective granular component defining inputs consumed by the element, outputs produced by the element and inter-relationships with other elements represented by inter-relationships with other granular components.

3. The control network of claim 2, the hierarchy further defining a hierarchy between control agents whereby a control agent at a higher level in the hierarchy is configured to authorise a control action for a subsidiary granular component in the hierarchy, the control hub being configured to communicate the control action upon said authorisation.

4. The control network of claim 1, wherein the control hub is arranged to record data on the control action linked to the particular granular component in the data repository, the control hub being further configured to receive data on an outcome of effecting the control action and record data on the outcome linked to the particular granular component in the data repository.

5. The control network of claim 4, wherein the control hub is configured, during communication of the control action to the control agent, to obtain data from the repository on prior applications of the control action and communicate the obtained data to the control agent in an anonymised form.

6. The control network of claim 1, wherein the control agent comprises an application executable on a user computing device and configured to present a control action received from the control hub to a user via a user interface to approve the control action.

7. The control network as claimed in claim 6, the application being configured to present, via the user interface, an identified control action to the user and direct the user on how to apply the control action to an element of the entity.

8. The control network as claimed in claim 7, wherein the application includes an interface to an artificial intelligence system configured to simulate human conversation for directing the user on how to apply the control action to the element, the artificial intelligence system being selected from a set including a chatbot, expert system, neural network, heuristic system and a decision tree.

9. The control network as claimed in claim 6, wherein upon receiving multiple control actions from the control hub, the application being configured to highlight, via the user interface, the control action predicted to have the highest potential impact to the entity.

10. The control network of claim 6, wherein the application is further configured to receive feedback from the user on the outcome of the control action, the application being configured to communicate the feedback to the control hub.

11. The control network of claim 1, wherein the control hub is configured to determine an optimal control action from a set of predetermined control actions, the set of predetermined control actions being linked to data in the repository on historic applications of the respective control action.

12. The control network of claim 11, wherein the control hub is configured to select the control action from the set of predetermined control actions by:
identifying the particular granular component in the model in which the transformed performance data is below-average compared to other granular components of that type; and, selecting the control action having a historic application for that type of granular component in which the data on the historic application showed improvement after the application of the control action.

13. The control network of claim 12, wherein the control hub is configured to substantially continuously monitor the received data to classify the received data against previously seen data trends or patterns for granular components of that type.

14. A control system for controlling of a plurality of entities, the control system comprising:
a control hub, a data repository, a template library and a plurality of control agents,
the template library defining a plurality of granular components types, each of the granular component types defining, for each granular component of that type, inputs consumed, outputs produced and inter-relationships with other components; and
the control hub being configured to determine a hierarchy of the granular components that correspond to elements of the entity, each element comprising a component, attribute or function of the entity or entity part, generate a model for the hierarchy from granular components corresponding to the granular component types in the template library and store the model in the data repository,
wherein the control hub is configured to receive performance data on each entity, translate the performance data into data on the granular components and store the transformed data in the data repository in association with its respective granular component, the control hub being further configured to determine an optimal control action in respect of a particular granular component of one of the entities in dependence on the particular granular component's transformed data and on transformed data in the data repository for other granular components having the same type, each of the plurality of control agents being linked to one of the entities and associated with one or more of the respective entity's granular components, the control hub being arranged to communicate the control action to the control agent associated with the particular granular component to trigger the control agent to effect the control action via the link.

15. A method for controlling a plurality of entities executed by a control hub and a plurality of control agents that are remote of the control hub, the method comprising:
modelling, in a repository, the plurality of entities, the model for each entity comprising a plurality of granular components, each granular component having a type selected from a set of granular component types;
receiving, at the control hub, performance data on each entity;
translating, at the control hub, the performance data into data on the granular components;
storing the transformed data in a data repository in association with its respective granular component;
determining, by the control hub, an optimal control action in respect of a particular granular component of one of the entities in dependence on the granular component's transformed data and on transformed data in the data repository for other granular components having the same type;
linking each of the plurality of control agents to one of the entities and associating each control agent with one or more of the respective entity's granular components;
communicating, by the control hub, the control action to the control agent associated with the particular granular component; and,
effecting, by the control agent, the control action on the entity via the link.

* * * * *